Magnante

[15] 3,670,258
[45] June 13, 1972

[54] FREQUENCY-DOUBLED NEODYMIUM DOPED GLASS LASER UTILIZING A LITHIUM NIOBATE CRYSTAL

[72] Inventor: Peter C. Magnante, West Brookfield, Mass.

[73] Assignee: American Optical Corporation, Southbridge, Mass.

[22] Filed: Feb. 2, 1970

[21] Appl. No.: 7,626

[52] U.S. Cl............................................331/94.5, 307/88.3
[51] Int. Cl.........................................H01s 3/10, H01s 3/11
[58] Field of Search.................................331/94.5; 307/88.3

[56] References Cited

UNITED STATES PATENTS

| | | | |
|---|---|---|---|
| 3,426,294 | 2/1969 | Koester | 331/94.5 |
| 3,564,450 | 2/1971 | Immarco et al. | 331/94.5 |

FOREIGN PATENTS OR APPLICATIONS

| | | | |
|---|---|---|---|
| 984,590 | 2/1965 | Great Britain | 331/94.5 |

OTHER PUBLICATIONS

Wright et al., Physics Letters, Vol. 16, No. 3, Jun. 65 pp. 264-5

Comly et al., Applied Physics Letters, Vol. 12, No. 1, Jan. 68, pp. 7-9

*Primary Examiner*—William L. Sikes
*Assistant Examiner*—R. J. Webster
*Attorney*—William C. Nealon, Noble S. Williams, Robert J. Bird and Bernard L. Sweeney

[57] ABSTRACT

A frequency-doubled neodymium doped glass laser is provided in which a narrow spectral bandwidth, high-radiance neodymium doped glass laser is used to irradiate a lithium niobate crystal which is cut and aligned with the laser so that the crystal and laser are at the proper phase matching angle. A Q-switching device is included in the optical cavity of the laser to control the initiation of the laser oscillations thus permitting the attainment of higher peak power.

1 Claim, 3 Drawing Figures

INVENTOR.
PETER C. MAGNANTE
BY
AGENT

FREQUENCY-DOUBLED NEODYMIUM DOPED GLASS LASER UTILIZING A LITHIUM NIOBATE CRYSTAL

BACKGROUND OF THE INVENTION

This invention is related to lasers and is more particularly concerned with means for producing an efficient frequency-doubled laser output in a lithium niobate crystal which is irradiated by a neodymium glass laser.

Previously, the broadband, high power neodymium glass lasers were utilized to create a large second harmonic output with KDP (potassium dihydrogen phosphate) crystals when the beamspread of the laser is made small by means of mode selection. The neodymium glass laser may be powerful enough so that the second harmonic generation can be achieved with high efficiency; however, this high efficiency is attainable only because nearly perfect phase matching occurs throughout the laser's spectral bandwidth and is attainable over the entire length of the KDP crystal.

However, this high output efficiency in KDP occurs only when the crystal is irradiated with a high power neodymium glass laser source. This requires a large, expensive laser which is not always practical. In some instances, a lower power output at 5,300 A is all that is required. Lithium niobate fits this situation because high power is theoretically not required for efficient second harmonic generation in lithium niobate. This differential in input power between KDP and lithium niobate is in the range of 200 to 1 or greater.

Efficient conversion from the fundamental to the second harmonic has been achieved in lithium niobate with the extremely narrow bandwidth neodymium-ytterium-aluminum-garnet (Nd-YA1G) laser; however, the efficiencies that have been measured or predicted with the broad spectral bandwidth neodymium glass laser have been a few percent at most.

SUMMARY OF THE INVENTION

Accordingly, it is an object of the present invention to provide a frequency-doubled neodymium doped glass laser utilizing a lithium niobate crystal which operates at relatively high efficiencies.

Another object is to provide such a frequency-doubled neodymium doped glass laser which generates an output at 5,300 A which includes a Q-switching device to allow the population inversion in the neodymium glass laser rod to reach a high level before lasing occurs.

Briefly, the invention in its broadest aspect comprise a frequency-doubled neodymium doped glass laser which includes a narrow spectral bandwidth, high-radiance (power/area-solid angle) neodymium doped glass laser, and a lithium niobate crystal which is cut and aligned with the laser so that the crystal and laser beam are at the phase matching angle. In addition, means are provided for controlling the commencement of laser oscillations in the neodymium doped glass laser.

Further objects, advantages, and features of the invention will appear in the arrangement and construction of the constituent parts, in detail, as set forth in the following specification taken together with the accompanying drawing.

DETAILED DESCRIPTION OF THE PREFERRED EMBODIMENTS

As was stated above, lithium niobate ($LiNbO_3$) crystals are known to cause the generation of a second harmonic output at 5,300 A wavelength when irradiated by a Nd-YA1G crystal laser. This laser may be pulsed to supply sufficient power for the second harmonic generation; however, the neodymium doped glass laser has not been able to be used as a source of the fundamental 1.06 $\mu$ for converting to 0.53 $\mu$ radiation in $LiNbO_3$ because the efficiencies acquired or predicted have been very low. In order to convert most of neodymium glass laser's output energy to frequency-doubled energy, a source of high-radiance (power/area-solid angle) and narrow spectral bandwidth is required in order to insure proper phase matching in the direction of propagation of the energy in a lithium niobate crystal.

Figure 1:
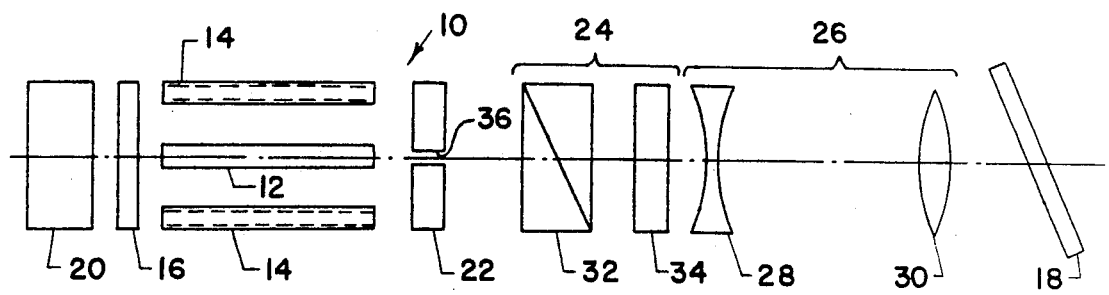
FIG. 1 is an optical schematic of a frequency-doubled neodymium glass laser according to the invention.

Referring initially to FIG. 1, there is shown a frequency-doubled neodymium glass laser, referred to generally by reference numeral 10, which embodies the present invention. A neodymium glass laser rod 12 is pumped by at least one flashlamp 14. The material from which the glass laser rod 12 is formed is disclosed in the copending application, Ser. No. 168,012 entitled "Amplifying Optical Energy," invented by Elias Snitzer, filed on Jan. 16, 1962, and assigned to the assignee of the present application. The process of exciting the active ions in the laser glass by means of the light emitted by the flashlamps 14 is called pumping. The laser glass rod 12, is pumped to a condition in which a large majority of the neodymium ions present in the glass have been excited to a high, metastable energy level from which laser emission occurs.

A resonant optical cavity which passes coaxially through the laser rod 12 is defined by a resonant reflector 16 and a reflecting diffraction grating 18. The grating is positioned at a predetermined angle with respect to the axis of the rod; the reasons for this will be discussed in greater detail below. Located adjacent to the resonant reflector 16 and external to the optical cavity is a lithium niobate crystal 20 which has been cut and aligned with the axis of the laser 10 so that the proper phase-matching angle occurs therebetween. Interposed between the other end of the laser rod 12 and the diffraction grating 18 are an aperture plate 22, a Q-switching device 24, and a telescope 26.

The telescope 26, which is composed schematically of optical elements 28 and 30, spreads the energy in the beam emitted by the rod 12 over a larger portion of the surface of the diffraction grating 18. This causes a decrease of the energy density on the diffraction grating 18 thereby allowing greater output intensity by the laser rod 12 without damage to the grating. Also the illumination of more lines on the grating increases the resolving power of the grating and hence, the narrowness of the spectral bandwidth. The telescope 26 is generally of Galilean form to avoid the creation of hot spots in the system.

A normal neodymium doped glass laser having conventional reflectors forming the resonant cavity, emits an output beam, the spectral bandwidth of which is from 10 A to 100 A wide. This output, as was stated above, is far too wide to be utilized as an efficient source for driving a lithium niobate crystal. The arrangement shown in FIG. 1 is capable of narrowing the spectral bandwidth to less than 0.5 A while the beam divergence is narrowed to less than 1.5 mrad. The temporal coherence of the laser beam, i.e. the monochromaticity, is achieved by the quartz etalon 16 and the diffraction grating 18. The diffraction grating achieves a narrowing of the spectral bandwidth because it diffracts the light which is reflected from it through an angle which varies with the wavelength. Accordingly, when the diffraction grating is positioned at a specific angle with respect to the optical axis of the laser cavity, only a specific wavelength of light will be diffracted at the proper angle to remain axial and thus the laser oscillations in the cavity will be limited to the narrow bandwidth related to that angle.

A description of a narrow spectral bandwidth glass laser utilizing a diffraction grating to selectively reflect the laser rod emissions is described in my copending application, Ser. No. 867,327, filed on Oct. 17, 1969, and again assigned to the assignee of the present application.

Figure 2:
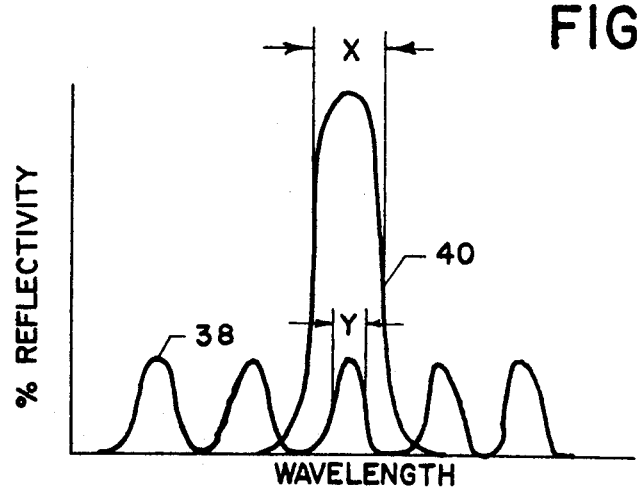
FIG. 2 is a graphical representation showing the spectral selectivity of the diffraction grating and the quartz etalon of the apparatus in FIG. 1.

The etalon 16 cooperates with the grating 18 to narrow the emitted spectral bandwidth. The quartz etalon 16, which is a light transmissive plate with strictly parallel surfaces, has a reflectivity which is periodic with wavelength. The axial distance between the etalon surfaces determines the period of the reflectivity as a function of the wavelength. Curve 38 in FIG. 2 shows this characteristic of the quartz etalon. Such an etalon, if used as a reflector in the laser cavity alone, would perform spectral selection to produce several spectral lines spaced approximately 1 A apart with the width of each line reflected being between 0.01 A and 0.1 A. Curve 40 in FIG. 2 shows the reflectivity of the diffraction grating at a particular wavelength. As the construction and orientation of the diffraction grating and quartz etalon are carefully controlled, the peak reflectivity of the grating may be made to coincide with one of the etalon reflection peaks as shown in FIG. 2. In this case, since the diffraction grating is able to narrow the spectral bandwidth to approximately 1 A; the etalon and diffraction grating acting together as the opposed reflectors defining the laser cavity, are able to limit the laser oscillations to a single spectral line between 0.01 A and 0.1 A wide.

The spatial coherence of the laser beam is controlled by the inclusion of an aperture plate 22 having an aperture 36 therein. The plate 22 serves as a means for rejecting the divergent emissions from the laser rod 12 so that the laser oscillations are highly collimated. This is accomplished by having a small diameter aperture 36 in the plate which is coaxial with laser rod 12 and the optical cavity which stops the build-up of an off-axis modes which might be caused by these divergent emissions so that those modes which are more divergent than those required for irradiating the lithium niobate crystal 20 never occur. The reason for improving the spatial coherence of the laser beam is because the laser beam components which might be incident on the lithium niobate crystal at a significant angle to that which establishes the optimal phase-matching angle will be effectively at a wavelength outside of the narrow spectral bandwidth required to drive the $LiNbO_3$ crystal.

The Q-switching device 24 is composed of a polarizer 32 such as a calcite block polarizer and an electro-optical device 34 such as a KDP crystal. The KDP crystal 34 alters the polarization of light incident on it from plane to circularity polarized when an electro-static field of approximately 6,000 volts is applied to the crystal. Therefore, on two passes through the crystal, the direction of polarization is rotated 90°.

The device operates in that the polarizer 32 allows light of one plane of polarization to pass in either direction unaffected and ejects the light of the opposite plane of polarization from the optical cavity. Hence, when the laser rod 12 is being pumped by the flashlamps 14, the activated neodymium ions in the laser rod tend to decay and emit light; however, during the initial period the light passes through the polarizer 32 and the KDP crystal which now has the electro-static field applied. Upon retroreflection by the diffraction-grating 18, the KDP crystal rotates, after the two passes, the plane of polarization of the light such that the polarizer 32 ejects the retroreflected light from the optical cavity thus preventing the stimulation of emissions within the laser rod 12. Therefore, the laser rod 12 may be pumped to a high state of population inversion without the emission of laser light. When the field is removed from the KDP crystal 34, the laser light may pass through the Q-switching device 24 uneffected and a strong laser output occurs. This causes an increase in power by a factor of approximately 1,000 over "long pulse" operation. The duration of the output is approximately $50 \times 10^{-9}$ sec. in a Q-switched operation and $10^{-3}$ sec. in "long pulse" operation.

Figure 3:
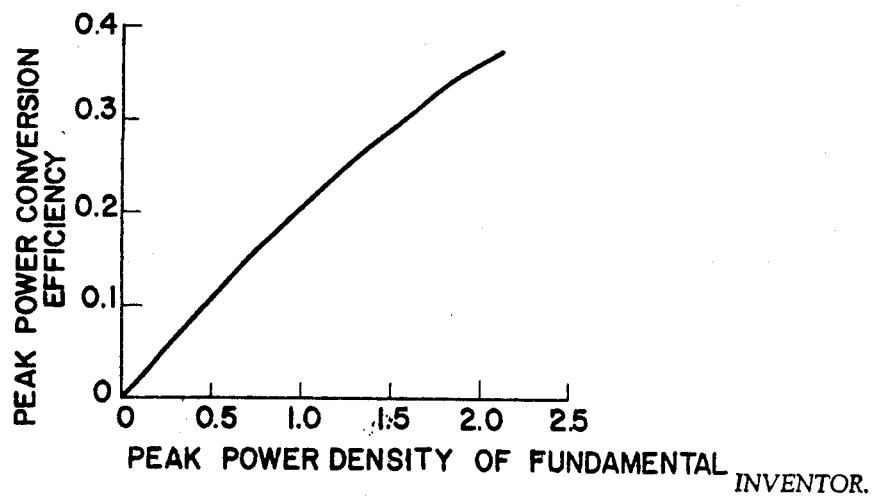
FIG. 3 is a plot of the power conversion efficiency as a function of the fundamental power input to the lithium niobate crystal.

A frequency doubled neodymium doped glass laser system, as shown in FIG. 1 was operated with the aforementioned mode selection means embodied therein which limited the spectral bandwidth to less than 0.5 A and the beam divergence to 1.5 mrad. a 21 percent conversion and a 33 percent peak power conversion where obtained with a fundamental power flux density of only two MW/cm² inside the crystal. This is shown by the plot of FIG. 3 wherein the peak power conversion efficiency is plotted against the peak power density of the fundamental wave applied to the lithium niobate crystal. The efficiency is determined by the ratio of the power flux density of the frequency-doubled, second harmonic wave which is above to leave the exit face of the crystal compared to the power flux density of the fundamental wave which has just entered the crystal. The input flux was not increased further in the experiments beyond that necessary to obtain the 33 percent peak power conversion because it was feared that damage might occur to the crystal. Theoretically, the conversion efficiency could become considerably higher if higher power were applied to the lithium niobate crystal. Furthermore, it has been found that by rotating the diffraction grating 18 about an axis, which is parallel to the lines on the grating and normal to the optical axis and by cooperatively rotating the crystal 20 about an axis normal to the optical axis; the output from the $LiNbO_3$ crystal can be tuned over a range of approximately 150 A.

While there have been shown and described what is considered to be a preferred embodiment of the present invention, it will be obvious to those skilled in the art that various changes and modifications can be made therein.

I claim:

1. A frequency-doubled neoydmium doped glass laser comprising a rod of neodymium doped laser glass, means for exciting the neodymium ions in the rod to a higher, metastable energy state from which laser emissions occur, to create a population inversion of the neodymium ions in the laser rod, means defining an optically resonant cavity passing axially through and coaxial with the glass laser rod so that laser oscillations may be generated in the cavity, means for controlling commencement of laser oscillations in the cavity, means for rejecting divergent emissions from the laser rod so that the laser oscillations are highly collimated, a lithium niobate crystal aligned with the axis of the laser rod and located external to the cavity, the lithium niobate crystal being cut and aligned so as to be at the phase matching angle, the means for defining a cavity comprising a resonant reflector interposed between one end of the laser rod and the lithium niobate crystal, and a diffraction grating position at the other end of the cavity, the resonant reflector and the diffraction grating being constructed and positioned so that only a narrow spectral band of light is retroreflected along the optical axis therebetween, and means for cooperatively rotating the diffraction grating and the lithium niobate crystal so that the output from the lithium niobate crystal may be tuned over a range of 150 A.

* * * * *